(12) United States Patent
Wong

(10) Patent No.: US 8,714,292 B1
(45) Date of Patent: May 6, 2014

(54) MOTORIZED WHEELED CHAIR ASSEMBLY

(71) Applicant: Keith K. Wong, Stockton, CA (US)

(72) Inventor: Keith K. Wong, Stockton, CA (US)

( * ) Notice: Subject to any disclaimer, the term of this patent is extended or adjusted under 35 U.S.C. 154(b) by 0 days.

(21) Appl. No.: 13/622,442

(22) Filed: Sep. 19, 2012

(51) Int. Cl.
*B62K 15/00* (2006.01)

(52) U.S. Cl.
USPC .......................... 180/208; 280/278; 280/287

(58) Field of Classification Search
USPC .................................. 180/208; 280/278, 287
See application file for complete search history.

(56) References Cited

U.S. PATENT DOCUMENTS

| | | | | |
|---|---|---|---|---|
| 2,508,932 | A * | 5/1950 | Turner | 297/212 |
| 3,513,926 | A * | 5/1970 | Paget, Jr. | 180/208 |
| 4,708,219 | A * | 11/1987 | Cresswell | 180/11 |
| 4,757,868 | A * | 7/1988 | Cresswell | 180/11 |
| 4,947,955 | A * | 8/1990 | Hopely, Jr. | 180/216 |
| 5,150,762 | A * | 9/1992 | Stegeman et al. | 180/208 |
| 5,695,021 | A * | 12/1997 | Schaffner et al. | 180/208 |
| 5,826,670 | A | 10/1998 | Nan | |
| 6,030,045 | A * | 2/2000 | Hoshino | 297/461 |
| 6,273,206 | B1 * | 8/2001 | Bussinger | 180/208 |
| 6,371,235 | B1 | 4/2002 | Wisecarver | |
| 7,059,621 | B2 * | 6/2006 | Di Blasi et al. | 280/287 |
| D531,094 | S | 10/2006 | Flowers et al. | |
| 7,159,681 | B1 | 1/2007 | Sauve | |
| 7,234,781 | B2 * | 6/2007 | Liao | 297/461 |
| 7,267,192 | B2 * | 9/2007 | Lin et al. | 180/208 |
| 7,267,347 | B2 * | 9/2007 | Chang | 280/87.05 |
| 7,654,356 | B2 | 2/2010 | Wu | |
| 7,703,567 | B2 * | 4/2010 | Wang | 180/208 |
| 7,926,606 | B2 | 4/2011 | Wang | |
| 7,967,095 | B2 * | 6/2011 | Kosco et al. | 180/208 |
| 2003/0070855 | A1 * | 4/2003 | Horii et al. | 180/208 |
| 2005/0077097 | A1 * | 4/2005 | Kosco et al. | 180/208 |
| 2006/0243507 | A1 | 11/2006 | Huber | |
| 2007/0187922 | A1 * | 8/2007 | Boutakis | 280/287 |
| 2009/0020350 | A1 | 1/2009 | Wu | |
| 2010/0012400 | A1 | 1/2010 | Patmont et al. | |

* cited by examiner

*Primary Examiner* — Drew Brown

(57) ABSTRACT

A motorized wheeled chair assembly facilitates movement by a person while seated on a chair. The assembly includes a frame and a plurality of wheels coupled to the frame. A seat and a motor are coupled to the frame. The motor is operationally coupled to one of the wheels defining a motorized wheel wherein the motor rotates the motorized wheel. A handle is coupled to the frame by an arm having a first end coupled to the handle and a second end removably coupled to the frame. A motor control is coupled to the handle and operationally coupled to the motor.

12 Claims, 3 Drawing Sheets

US 8,714,292 B1

MOTORIZED WHEELED CHAIR ASSEMBLY

BACKGROUND OF THE DISCLOSURE

Field of the Disclosure

The disclosure relates to mobile chair devices and more particularly pertains to a new mobile chair device for facilitating movement by a person while seated on a chair.

SUMMARY OF THE DISCLOSURE

An embodiment of the disclosure meets the needs presented above by generally comprising a frame and a plurality of wheels coupled to the frame. A seat and a motor are coupled to the frame. The motor is operationally coupled to one of the wheels defining a motorized wheel wherein the motor rotates the motorized wheel. A handle is coupled to the frame by an arm having a first end coupled to the handle and a second end removably coupled to the frame. A motor control is coupled to the handle and operationally coupled to the motor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
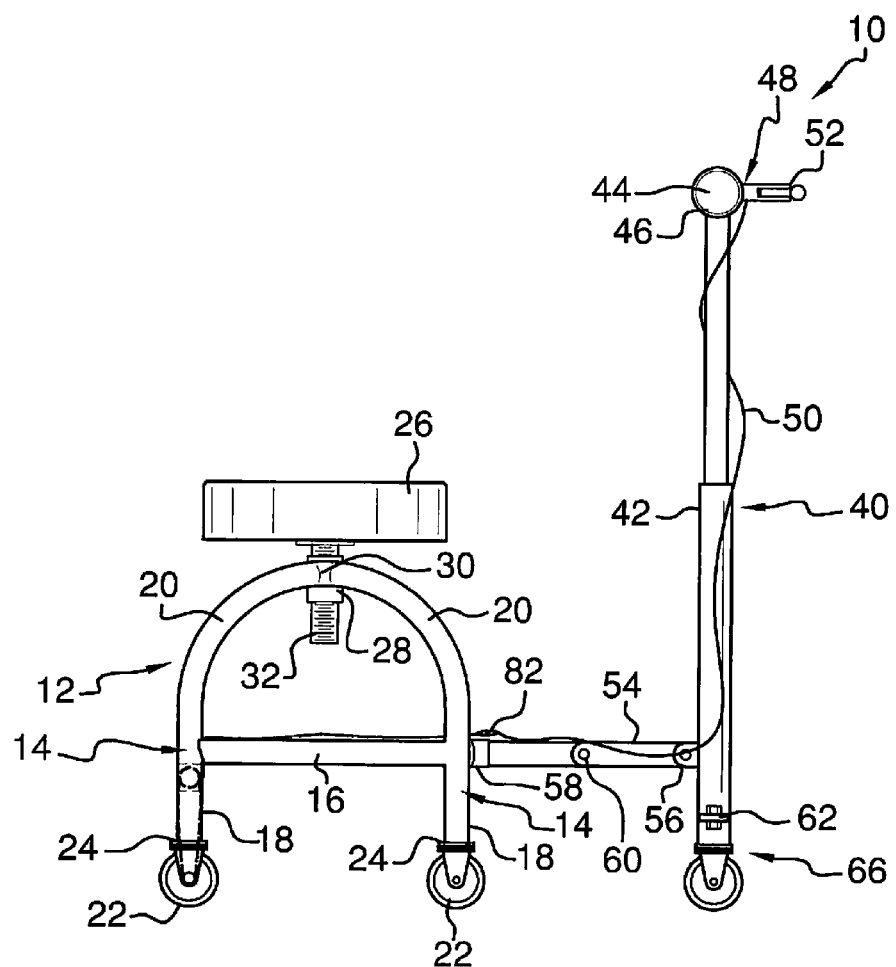
FIG. 1 is a side view of a motorized wheeled chair assembly according to an embodiment of the disclosure.
Figure 2:
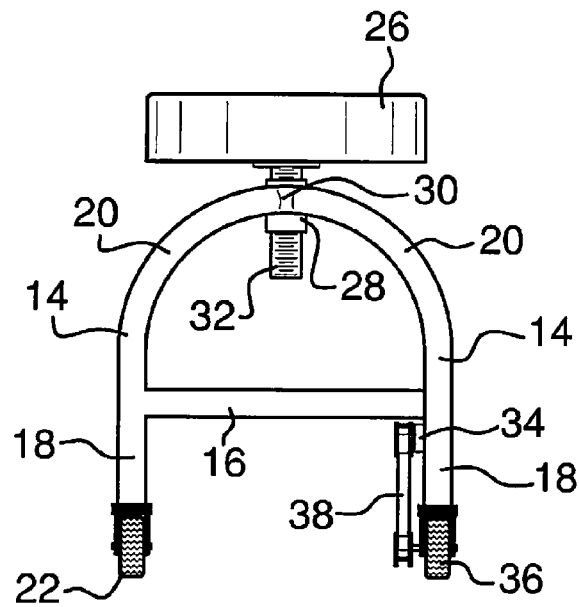
FIG. 2 is a back view of an embodiment of the disclosure.
Figure 3:
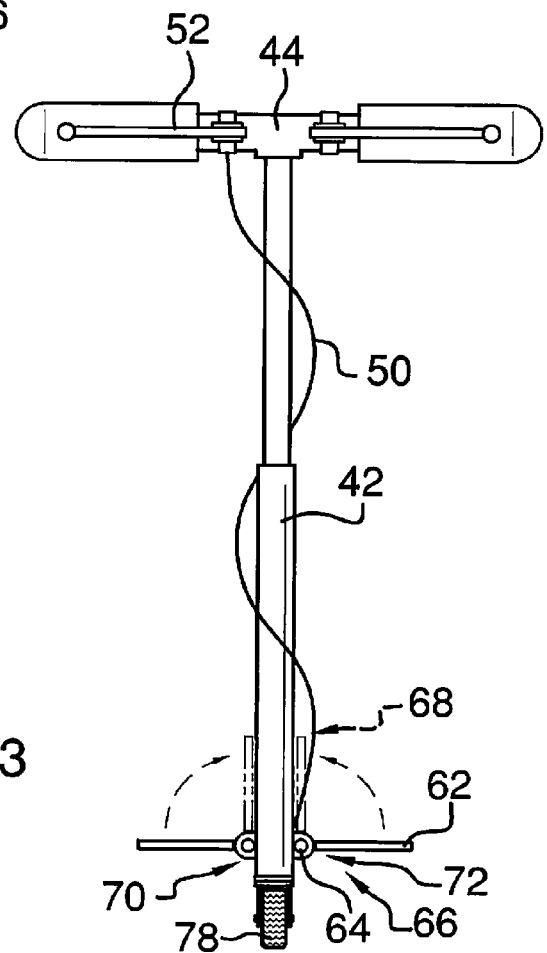
FIG. 3 is a front view of an embodiment of the disclosure.
Figure 4:
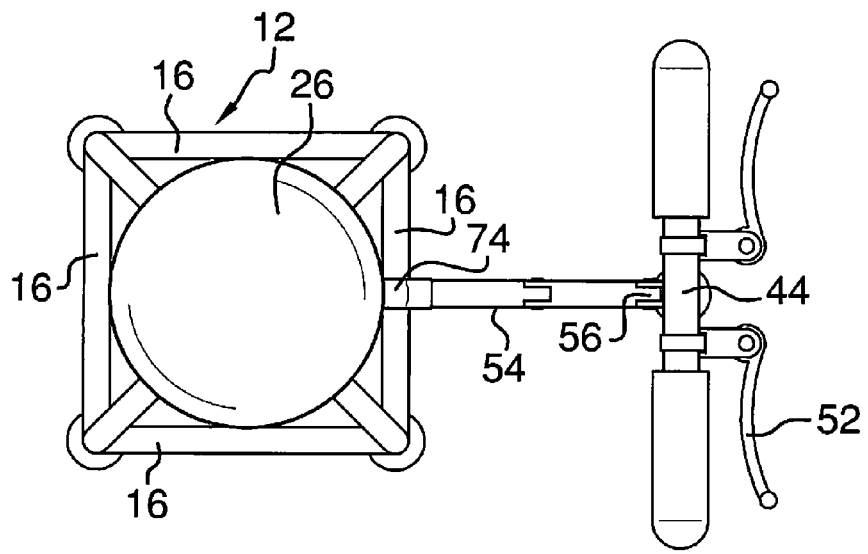
FIG. 4 is a top view of an embodiment of the disclosure.
Figure 5:
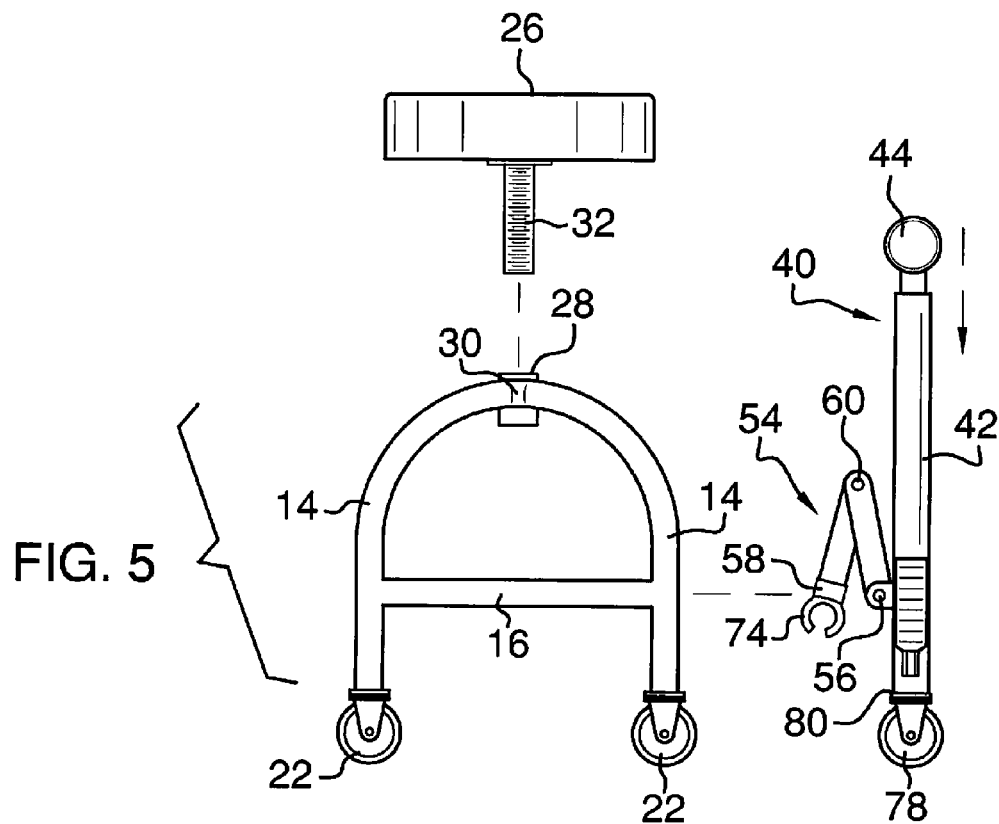
FIG. 5 is a partially exploded side view of an embodiment of the disclosure.

With reference now to the drawings, and in particular to FIGS. 1 through 5 thereof, a new mobile chair device embodying the principles and concepts of an embodiment of the disclosure and generally designated by the reference numeral 10 will be described.

As best illustrated in FIGS. 1 through 5, the motorized wheeled chair assembly 10 generally comprises a frame 12 having a plurality of legs 14 and a plurality of crossbars 16. Each crossbar 16 is coupled to and extends between an associated pair of the legs 14. Each leg 14 may have a straight lower portion 18 and a curved upper portion 20. A plurality of wheels 22 is coupled to the frame 12. Each wheel 22 is coupled to a base 24 of an associated one of the legs 14. A threaded collar 28 is coupled to the frame 12 at an upper end 30 of each of the legs 14. A seat 26 is coupled to the frame 12 by a threaded shaft 32 coupled to and extending from the seat 26. The shaft 32 extends through the collar 28.

A motor 34 is coupled to the frame 12. The motor 34 is operationally coupled to one of the wheels 22 defining a motorized wheel 36 wherein the motor 34 rotates the motorized wheel 36 as desired. A belt 38 may be used to connect the motor 34 to the motorized wheel 36. The motor 34 may also be attached to one of the legs 14 and the motor 34 and belt 38 aligned with the lower portion 18 of the leg 14.

A handle 40 has an elongated shaft 42 and a transverse bar 44 coupled to a top end 46 of the shaft 42. The shaft 42 may be telescopic such that a height of the handle 40 is adjustable. A motor control 48 is coupled to the handle 40. The motor control 48 is operationally coupled to the motor 34 using a cable 50. The motor control 48 may comprise a grip 52 pivotally coupled to the bar 44 of the handle 40. An arm 54 has a first end 56 coupled to the handle 40 and a second end 58 removably coupled to the frame 12. The first end 56 of the arm 54 may be pivotally coupled to the shaft 42 of the handle 40. A medial joint 60 is coupled to the arm 54 wherein the arm 54 is foldable into a retracted position. A foot rest 62 may be coupled to the handle 40. The foot rest 62 has a first end 64 pivotally coupled to the handle 40. The foot rest is pivotable between an extended position 66 and a storage position 68. The foot rest 62 may be one of a pair of foot rests 62 coupled to the handle 40. The pair of foot rests 62 is positioned on opposite sides 70,72 of the handle 40 to permit centering of the handle 40 in front of a person seated on the seat 26. A clamp 74 is coupled to the second end 58 of the arm 54. The clamp 74 removably couples the arm 54 to a selectable one of the crossbars 16. A handle wheel 78 is coupled to a base 80 of the handle 40. When removing the arm 54 and handle 40 from the frame 12, a connector plug 82 may be connected to the cable 50 to facilitate separation of the motor control 48 from the motor 34.

In use, the seat 26 may be adjusted to a desired height by rotation of the seat 26 relative to the frame 12. A person may sit on the seat 26 and grasp the handle 40. Manipulation of the motor control 48 actuates the motor 34 to rotate the motorized wheel 36 facilitating movement of the person on the seat 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A motorized wheeled chair assembly comprising:
    a frame;
    a plurality of wheels coupled to said frame;
    a seat coupled to said frame;
    a motor coupled to said frame, said motor being operationally coupled to one of said wheels defining a motorized wheel, wherein said motor rotates said motorized wheel;
    a handle including a shaft and a traverse bar coupled to a top end of said shaft;

a motor control coupled to said handle, said motor control being operationally coupled to said motor; and an arm having a first end coupled to said traverse bar of said handle and a second end removably coupled to said frame said first end of said arm being pivotally coupled to said handle, said arm including a first section attached to said handle and a second section attached to said frame, said first and second sections being pivotally coupled together by a medial joint wherein said first and second sections of said arm are foldable with respect to each other into a retracted position.

2. The assembly of claim 1, further comprising:

a threaded collar coupled to said frame; and a threaded shaft coupled to and extending from said seat, said shaft extending through said collar.

3. The assembly of claim 1, further comprising said motor control being a grip pivotally coupled to said handle.

4. The assembly of claim 1, further comprising said handle being telescopic.

5. The assembly of claim 1, further comprising a foot rest coupled to said handle.

6. The assembly of claim 5, further comprising said foot rest having a first end pivotally coupled to said handle, said foot rest being pivotable between an extended position and a storage position.

7. The assembly of claim 5, further comprising said foot rest being one of a pair of foot rests coupled to said handle.

8. The assembly of claim 7, further comprising said pair of foot rests being positioned on opposite sides of said handle.

9. The assembly of claim 1, further comprising:

said frame having a plurality of legs, each wheel being coupled to an associated one of said legs; and a plurality of crossbars, each crossbar being coupled to and extending between an associated pair of said legs.

10. The assembly of claim 9, further comprising a clamp coupled to said second end of said arm, said clamp removably coupling said arm to a selectable one of said crossbars.

11. The assembly of claim 1, further comprising a handle wheel coupled to a base of said handle.

12. A motorized wheeled chair assembly comprising:

a frame, said frame having a plurality of legs, said frame having a plurality of crossbars, each crossbar being coupled to and extending between an associated pair of said legs;

a plurality of wheels coupled to said frame, each wheel being coupled to an associated one of said legs, each wheel being coupled to a base of an associated one of said legs;

a seat coupled to said frame;

a motor coupled to said frame, said motor being operationally coupled to one of said wheels defining a motorized wheel, wherein said motor rotates said motorized wheel;

a handle, said handle having an elongated shaft and a transverse bar coupled to a top end of said shaft, said shaft being;

a motor control coupled to said handle, said motor control being operationally coupled to said motor, said motor control being a grip pivotally coupled to said handle;

an arm having a first end coupled to said handle and a second end removably coupled to said frame, said first end of said arm being pivotally coupled to said handle;

a threaded collar coupled to said frame, said threaded collar being coupled to an upper end of each said leg of said frame;

a threaded shaft coupled to and extending from said seat, said shaft extending through said collar;

said arm including a first section attached to said handle and a second section attached to said frame, said first and second sections being pivotally coupled together by a medial joint wherein said first and second sections of said arm are foldable with respect to each other into a retracted position;

a foot rest coupled to said handle, said foot rest having a first end pivotally coupled to said handle, said foot rest being pivotable between an extended position and a storage position, said foot rest being one of a pair of foot rests coupled to said handle, said pair of foot rests being positioned on opposite sides of said handle;

a clamp coupled to said second end of said arm, said clamp removably coupling said arm to a selectable one of said crossbars; and a handle wheel coupled to a base of said handle.

* * * * *